United States Patent [19]

Zakai et al.

[11] Patent Number: 4,702,280

[45] Date of Patent: Oct. 27, 1987

[54] IRRIGATION LEAKAGE PREVENTION DEVICE

[75] Inventors: Avraham Zakai, Rishon Le-Zion; Adiel Shfaram, Doar Na Hof Ashkelon, both of Israel

[73] Assignee: Dan Mamtirim, Galil Elyon, Israel

[21] Appl. No.: 894,253

[22] Filed: Aug. 7, 1986

[30] Foreign Application Priority Data

Aug. 20, 1985 [IL] Israel ........................................ 76145

[51] Int. Cl.$^4$ ................................................ F16K 7/02
[52] U.S. Cl. ...................................... 137/853; 137/860; 251/331; 239/99
[58] Field of Search ............... 137/843, 853, 859, 860; 251/5, 61.1, 331; 239/34, 99

[56] References Cited

U.S. PATENT DOCUMENTS

| | | | |
|---|---|---|---|
| 2,353,143 | 7/1944 | Bryant | 137/843 |
| 2,573,712 | 11/1951 | Kallam | 251/5 |
| 3,608,676 | 9/1971 | Wieck | 137/853 |
| 4,023,772 | 5/1977 | Ratelband | 251/5 |
| 4,451,023 | 5/1984 | Zakai | 251/61.1 |
| 4,481,970 | 11/1984 | Reid | 137/853 |

Primary Examiner—Alan Cohan
Attorney, Agent, or Firm—Browdy and Neimark

[57] ABSTRACT

An irrigation leakage prevention device for coupling between an irrigation supply source and an irrigation emitter unit. The device comprises a tubular throughflow conduit, at least the central portion thereof being formed of a resiliently flexible material and having end portions which are held against resilient displacement, a central barrier member being fixedly located within the conduit. With a water supply pressure less than a predetermined minimum, the central portion of the conduit sealingly embraces the barrier so as to prevent throughflow and when the water supply pressure exceeds this minimum, the central portion is resiliently displaced away from the barrier so as to allow throughflow.

1 Claim, 1 Drawing Figure

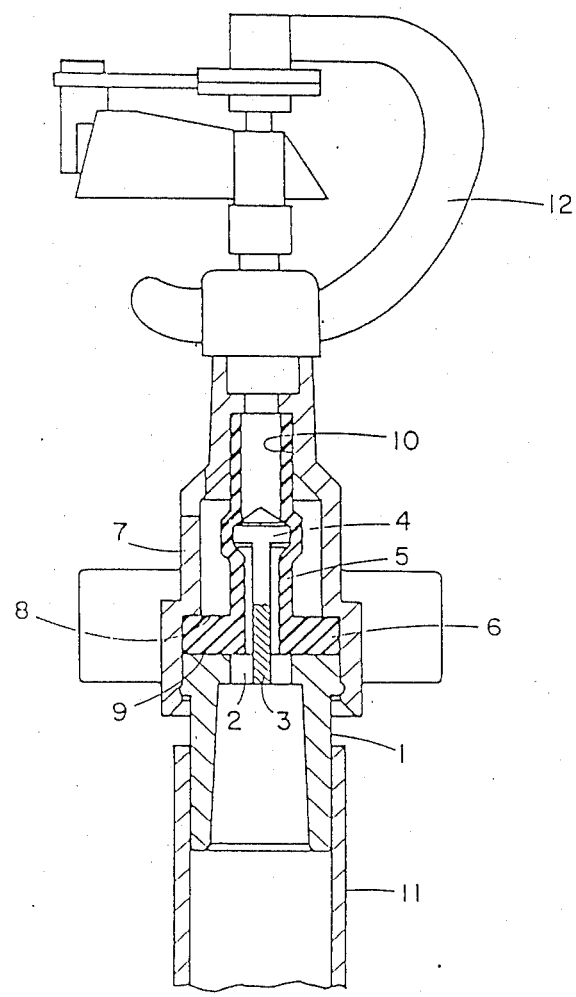

IRRIGATION LEAKAGE PREVENTION DEVICE

FIELD OF INVENTION

This invention relates to an irrigation leakage prevention device. In irrigation installations irrigation emitter units such as, for example, rotary sprinklers or drippers are associated with irrigation supply lines through which water is supplied to the units for emission by them. In many cases the irrigation supply lines are used to supply to the units, in addition to the irrigation water, also additives such as fertilizers or the like.

BACKGROUND OF THE INVENTION

It is becoming increasingly common for irrigation installations to be operated intermittently, i.e. the irrigation water is supplied to the installation at regular intervals and for accurately predetermined periods of time. In this way it is ensured that the agricultural crops being irrigated receive an accurately predetermined amount of irrigation water and additives. However, in order to achieve this end it is necessary to ensure that the actual periods during which irrigation water is supplied to the emitter units are strictly predetermined and controlled.

For this purpose the irrigation supply is fed to the installation in predetermined pulses of predetermined time lengths. However, it will be readily realised that each irrigation pulse cannot instantaneously rise to its maximum value upon the initiation of the pulse and similarly it cannot instantaneously die down to zero value upon termination of the pulse. In consequence, the irrigation pulse fed to the unit has got a finite build-up time, a finite peak time and a finite decay time, whilst the irrigation feed to the crops is calculated solely on the basis of the peak time. The fact that irrigation water and the additives continue to be fed (leak) to the crops during the build-up and the decay time may lead to undesirable results. Thus, for example, during the build-up and decay times the plants in the immediate vicinity of a rotary sprinkler will continue to receive irrigation water and additives whilst other plants, which are normally within the range of the sprinkler, will not.

SUMMARY OF THE INVENTION

It is an object of the present invention to provide, for use in an irrigation installation, an irrigation leakage prevention device whereby the above-referred to disadvantages are substantially reduced or avoided.

According to the present invention there is provided an irrigation leakage prevention device for coupling between an irrigation supply source and an irrigation emitter unit and comprising a tubular throughflow conduit, at least the central portion thereof being formed of a resiliently flexible material, end portions of said conduit being held against resilient displacement, a central barrier member fixedly located within said conduit, the arrangement being such that with a water supply pressure less than a predetermined minimum, the central portion of the conduit sealingly embraces said barrier so as to prevent throughflow and when the water supply pressure exceeds said minimum, said central portion is resiliently displaced away from the barrier so as to allow throughflow.

When such a leakage prevention device is coupled between the irrigation supply source and the irrigation emitter unit, the displacement of the tubular conduit away from the central barrier takes place only when the irrigation supply pulse has reached its peak value. Thus, the irrigation supply only reaches the emitter unit at its peak supply pressure and irrigation water does not leak out of the unit during the build-up and decay periods.

BRIEF DESCRIPTION OF DRAWING

For a better understanding of the present invention and to show how the same may be carried out in practice, reference will now be made to the accompanying drawing which is a longitudinally sectioned side elevation of the irrigation leakage prevention device in accordance with the present invention shown coupled to a rotary dripper unit.

DETAILED DESCRIPTION OF EMBODIMENT

As seen in the drawing, the device comprises a coupling duct 1 having an end aperture 2 from which extends an integrally formed barrier stem 3 which terminates in a barrier disc 4. Surrounding the barrier stem 3 and barrier disc 4 is a tubular conduit 5 formed of a resiliently distortable material and having an annular base 6.

A housing member 7 fits over the coupling duct 1 and is secured thereto so as to sandwich between an inwardly directed flange 8 thereof and a corresponding flange 9 of the coupling duct 1, the annular base 6 of the conduit 5. The upper end of the conduit 5 extends into an outlet port 10 formed in the housing 7 with the outer walls of the upper end of the conduit 5 bearing against the inner walls of the outlet port 10. The housing 7 is provided with venting ports 7a.

As can be seen in the drawing, the coupling duct 1 is coupled to an irrigation supply pipe 11 whilst the outlet port 10 is coupled to an irrigation sprinkler device 12.

In use, an irrigation supply reaching the device via the pipe 11 is blocked as a result of the flexible conduit 5 sealingly embracing the barrier disc 4. When, however, the supply pressure of the irrigation supply exceeds a predetermined minimum, the flexible conduit 5 is displaced outwardly with respect to the barrier disc 4 and as a consequence throughflow of irrigation water takes place to the sprinkler device 12. As soon, however, as the pressure of the irrigation supply falls below the predetermined minimum the flexible conduit 5 springs back so as sealingly to embrace the barrier disc 4 thereby cutting off the further flow of irrigation water to the irrigation device.

It should be pointed out that the opening of the conduit 5 to throughflow is substantially instantaneous. Thus, as soon as the conduit 5 is displaced from the barrier disc 4, the outwardly displacing water pressure is exerted on the entire inner surface of the conduit 5 on either side of the disc 4 thereby ensuring the effective and substantially instantaneous opening of the conduit 5.

It will therefore be readily seen that water only flows to the irrigation device during the peak pressure of the irrigation supply. In this way, leakage of water during the build-up and decay period of the irrigation supply pulses is prevented.

We claim:

1. An irrigation emitter unit comprising an emitter coupling duct designed to be coupled at one end thereof to an irrigation supply; a barrier stem formed integrally with an apertured opposite end of said coupling duct; a barrier disc formed integrally with an end of said barrier stem remote from said coupling duct; a housing member coupled to said coupling duct so as to embrace said coupling duct and surround the barrier stem; and a resiliently flexible sleeve surrounding said barrier stem and clamped at one end thereof by the interengagement of said duct and said housing member, the opposite end of said stem remaining free; the arrangement being such that with a water supply pressure less than a predetermined minimum the central portion of the sleeve sealingly contacts said barrier disc so as to prevent throughflow whilst when the water supply pressure exceeds said minimum said central portion is resiliently displaced away from said barrier disc so as to allow throughflow.

* * * * *